(12) United States Patent
Murawska

(10) Patent No.: US 11,120,571 B2
(45) Date of Patent: Sep. 14, 2021

(54) SYSTEM FOR MEASURING DEFORMATIONS AND A METHOD FOR MEASURING DEFORMATIONS

(71) Applicant: INTELLIGENT CONSTRUCTION SAFETY SYSTEMS Sp. z o.o., Lublin (PL)

(72) Inventor: Monika Karolina Murawska, Latchorzew (PL)

(73) Assignee: INTELLIGENT CONSTRUCTION SAFETY SYSTEMS SP. Z.O.O., Lublin (PL)

(*) Notice: Subject to any disclaimer, the term of this patent is extended or adjusted under 35 U.S.C. 154(b) by 0 days.

(21) Appl. No.: 16/601,089

(22) Filed: Oct. 14, 2019

(65) Prior Publication Data

US 2020/0402254 A1    Dec. 24, 2020

(30) Foreign Application Priority Data

Jun. 19, 2019 (PL) .......................... 430286

(51) Int. Cl.
*G06K 9/00* (2006.01)
*G06T 7/70* (2017.01)

(52) U.S. Cl.
CPC ...... *G06T 7/70* (2017.01); *G06T 2207/30204* (2013.01)

(58) Field of Classification Search
CPC ......... G06T 7/70; G06T 7/401; G06T 11/001; G06T 2207/30204; G06K 9/48; G06K 9/4604; G06K 9/643; G06K 9/52; H04N 1/193; H04N 1/047; H04N 1/107; H04N 9/045; G01B 11/303
See application file for complete search history.

(56) References Cited

U.S. PATENT DOCUMENTS

| | | | |
|---|---|---|---|
| 6,556,288 B1* | 4/2003 | Chovan | G01D 5/268 356/138 |
| 7,707,001 B2* | 4/2010 | Obinata | G01N 19/02 702/127 |
| 8,830,477 B2* | 9/2014 | Schreiber | G01M 5/0033 356/460 |

(Continued)

FOREIGN PATENT DOCUMENTS

CN    106225708 A    12/2016

OTHER PUBLICATIONS

English Machine Translation of CN106225708A dated Dec. 14, 2016.

*Primary Examiner* — Amir Alavi
(74) *Attorney, Agent, or Firm* — Dickinson Wright PLLC; Andrew D. Dorisio

(57) ABSTRACT

A system is for measuring the deformations of at least one element of at least one examined construction, with at least one marker (1) fixedly attached to an element of the examined construction, at least one sensor (2) configured and programmed to record data related to the position of the marker (1) in the form of digital data, a processing unit (4) configured and programmed to process the data related to the position of the marker (1), connected communicatively to the sensor (2), preferably via a receiving unit (3), characterised in that the marker (1) comprises at least ten light-emitting characteristic points. A method is also provided for measuring the deformations of the examined construction implemented in such a system.

16 Claims, 4 Drawing Sheets

(56) References Cited

U.S. PATENT DOCUMENTS

Figure 1:
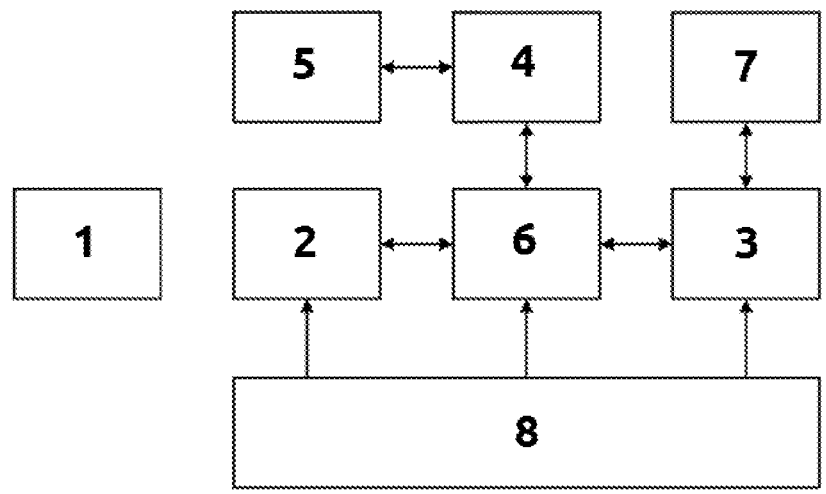

| | | | | |
|---|---|---|---|---|
| 9,026,398 B2 * | 5/2015 | Takasugi | ................ | A63B 69/36 |
| | | | | 702/151 |
| 9,261,355 B2 | 2/2016 | Bertolotti | | |
| 10,488,183 B1 * | 11/2019 | Wolf | ................... | G01M 5/0016 |
| 2015/0316358 A1 * | 11/2015 | Ali | ......................... | E04C 5/012 |
| | | | | 52/1 |
| 2016/0360954 A1 * | 12/2016 | Rohling | ............... | H04N 13/296 |
| 2019/0072500 A1 * | 3/2019 | Green | ...................... | D06H 3/14 |
| 2020/0402254 A1 * | 12/2020 | Murawska | ................ | G06T 7/70 |

* cited by examiner

SYSTEM FOR MEASURING DEFORMATIONS AND A METHOD FOR MEASURING DEFORMATIONS

TECHNICAL FIELD

The object of the present invention is a system for measuring deformations and a method for measuring deformations. The system and the method are intended in particular for measuring deformations of the structural elements of buildings, in particular high-storage warehouses, large-size structures, multi-story facilities and buildings, bridges, viaducts and roofs.

BACKGROUND

Document U.S. Pat. No. 9,261,355B2 discloses a device for optical measurement of the curvature of a wind power plant rotor blade. The rotor blade is attached on a blade base to a rotor hub or a rotor. The device comprises at least one light-emitting external marker, attached to the rotor blade at a certain distance from the blade base, at least one camera attached to the rotor in order to capture the light emitted from the external marker. The device provides information on the first location depending on the relative position of the camera relative to the external marker. An assessing device is coupled with the camera, and the means for detecting the position detect the relative position of the camera relative to the blade base and provide second information on the position as a function of said relative position. The assessing device determines at least one variable characterising the rotor blade curvature when assessing information on the position.

The abovementioned solution is not used for the needs of measuring large constructions, such as bridges or the roofs of buildings. Additionally, it is necessary to know the position of the camera relative to the observed marker.

Document CN106225708A discloses an optical system for measuring susceptibility insensitive to the surrounding light. The general optical system for measuring susceptibility comprises a black and white industrial camera, a lens with a constant focal length, an electronic theodolite, a machine for measuring the distance, a stand, a monochromatic LED target of high brightness, a narrow sheet of bandpass filter corresponding to the monochromatic wavelength of the light source and a computer. The monochromatic LED target is installed in the tested point. An optical flex sensor with a narrow bandpass filter installed on the object lens is used to record the video image of the LED target in real time. The data is acquired in real time by means of an image-tracing algorithm based on adjustment of the correlation of image greyness or the extraction of characteristic points. The overall optical system for measuring susceptibility is insensitive to changes in the surrounding light; it can implement a precise measurement of displacement or elasticity during the day or night; it can calculate numerous positions of an object in one image and implements a dynamic measurement of displacement or elasticity in real time for numerous detected points.

The above solution only enables measuring the displacements of points—due to the point light source, it is not possible to determine the rotation of the target. Apart from the camera and the target emitting monochromatic light, the system requires numerous additional objects, such as filters and devices for measuring the distance.

SUMMARY

The object of the invention is to provide a system and a method for measuring deformations, free of the abovementioned drawbacks. The system and method according to the invention provide a simpler system and method, which are adjusted to measuring displacements and rotations of markers attached to the monitored and/or examined structural elements of buildings.

The system for measuring the deformations of at least one element of at least one examined construction comprising at least one marker fixedly attached to an element of the examined construction, at least one sensor configured and programmed to record data related to the position of the marker in the form of digital data. Moreover, the system includes a processing unit configured and programmed for processing data related to the position of the marker, communicatively connected to the sensor, preferably via a receiving unit. The system is characterised in that the marker comprises at least ten light-emitting characteristic points.

Preferably, the system has light-emitting characteristic points which comprise a point light source or a surface light source.

Preferably, in the system, the smallest dimension of the light-emitting characteristic points is larger than 3 mm, preferably 5 mm, and most preferably 11 mm. Depending on the range of work, the dimension of characteristic points must be different, the further the marker from the sensor, the larger the characteristic point must be.

Preferably, in the system, the marker comprises at least fourteen characteristic points, and more preferably at least twenty-seven characteristic points.

Preferably, in the system, the characteristic points form an asymmetrical shape.

Preferably, the system has a sensor provided with a surface image sensor and an optical path, wherein the angle between the optical axis of the optical path and a normal to the plane defined by three characteristic points of the marker located the closest to the sensor being higher than 7° and lower than 75°, preferably lower than 40°.

Preferably, the system comprises at least two markers having at least two various arrangements of characteristic points, and preferably each marker has a unique arrangement of characteristic points, different from the arrangement of characteristic points of the other markers.

Preferably, in the system, the characteristic points of the marker are adjusted to being controlled, in particular turned on and turned off, by the receiving unit or the processing unit, which receiving unit or processing unit is communicatively connected to the marker.

Preferably, the system has a sensor provided with an optical path with a constant focal length.

Preferably, the system has a sensor connected to the receiving unit or the processing unit via a link for the transmission of data.

Preferably, the system comprises at least one receiving unit or at least one end device, the receiving unit and/or end device being connected to the processing unit via a link for the transmission of data.

The invention also comprises a method for measuring the deformations of an examined construction, implemented in a system comprising at least one marker fixedly attached to an element of the examined construction, at least one sensor configured and programmed to record data related to the position of the marker in the form of digital data, a processing unit configured and programmed to process the data related to the position of the marker, connected communicatively to the sensor, preferably via a receiving unit. The method comprises the steps of:

a) recording and preferably initially processing the data related to the position of the marker by the sensor in the form of digital data, b) transmitting this digital data to the processing unit, preferably by means of the receiving unit, which preferably compresses the received digital data before transmitting it to the processing unit.

The method is characterised in that a marker comprising at least ten light-emitting characteristic points is used, and by knowing the reference model of characteristic points of the marker and knowing the reference position of the centre of the marker and the reference rotation of the marker, c) rotation and position of the centre of the marker is determined by virtual rotation and adjustment of the reference model of characteristic points of the marker to the digital data, d) displacement and rotation of the marker are determined by comparing the rotation and position of the centre of the marker, determined in step c), with a reference position of the centre of the marker and a reference rotation of the marker.

Preferably, while performing the method, calibration is performed before the first measurement, during which, based on the recorded digital data determining the positions and rotation of the marker, at least one parameter describing the deformation of the image by the optical path of the sensor is determined, which parameter is used during the measurements to correct the recorded digital data.

Preferably, the method is implemented in a network architecture, where the sensor, the receiving unit and the processing unit work in a server-client-server architecture, the sensor and the processing unit being the servers, and the receiving unit being the client, where the receiving unit, based on preliminarily determined parameters, cyclically sends out commands of transmitting the data from at least one sensor, and upon receiving the data transmits it to the processing unit.

Preferably, the method is implemented where a surface image sensor provided with an optical path is used as the sensor, and a marker comprising at least ten characteristic points is used, the sensor and marker being located and set up relative to each other such that the angle between the optical axis of the optical path and a normal to the plane defined by three characteristic points of the marker located the closest to the sensor is higher than 7° and lower than 75°, preferably lower than 40°.

BRIEF DESCRIPTION OF THE DRAWING FIGURES

Figure 2:
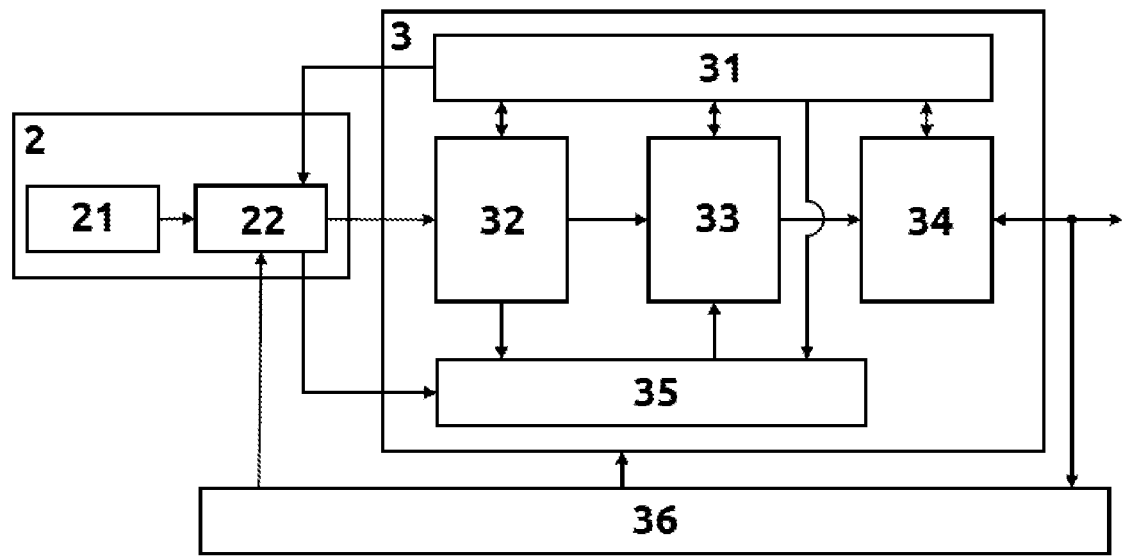
Figure 3:
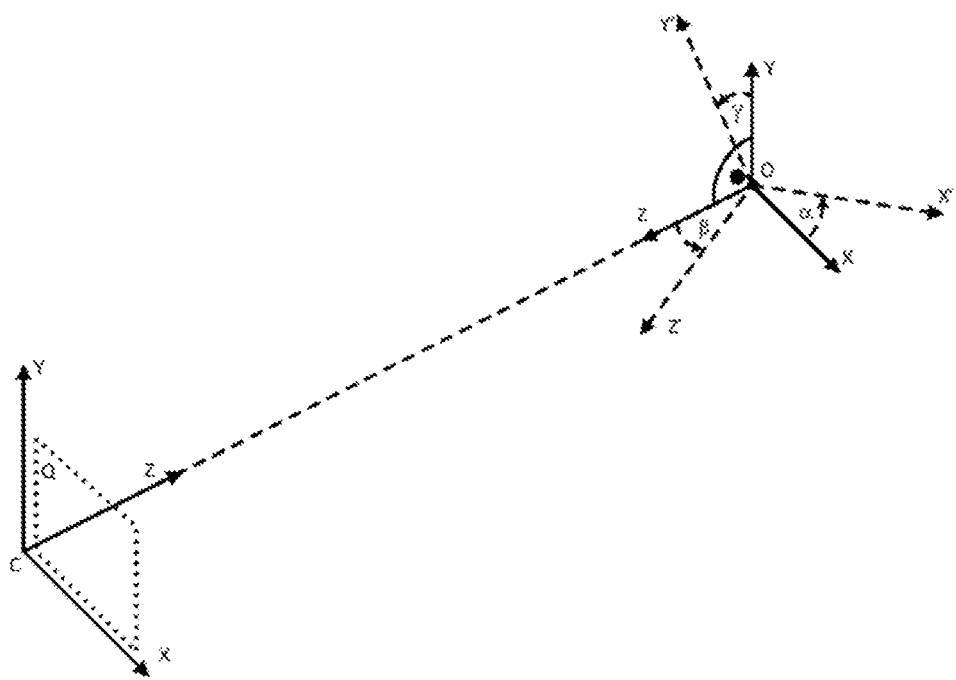
Figure 4:
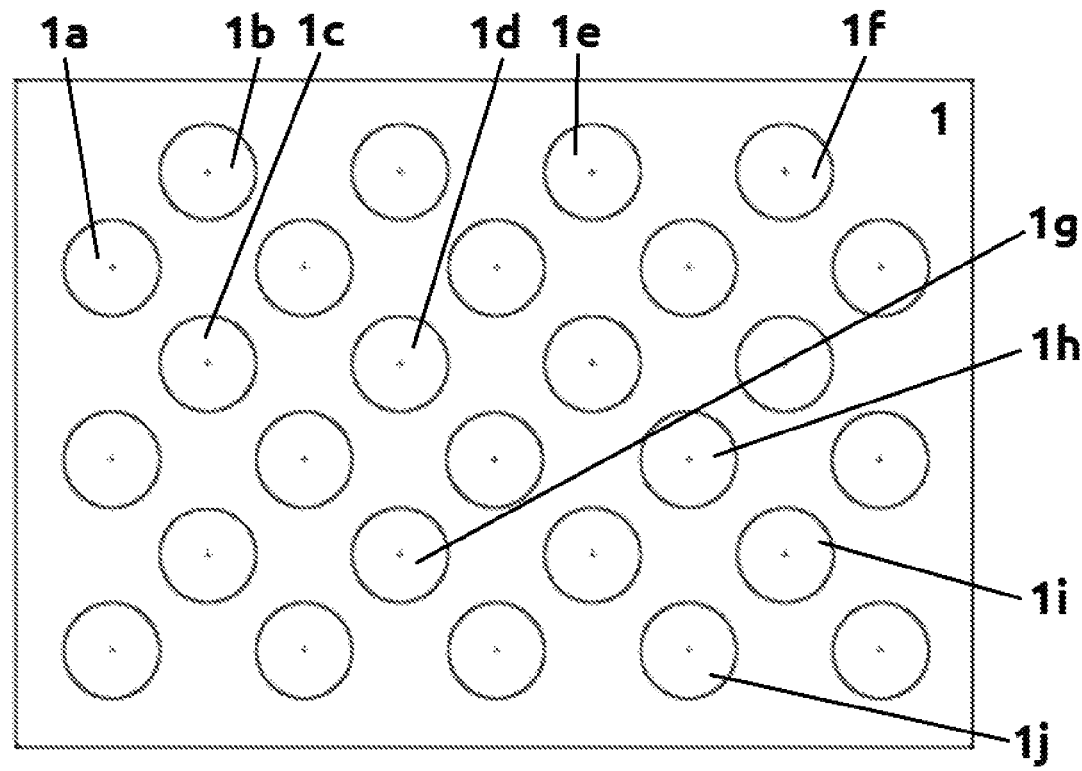
Figure 5:
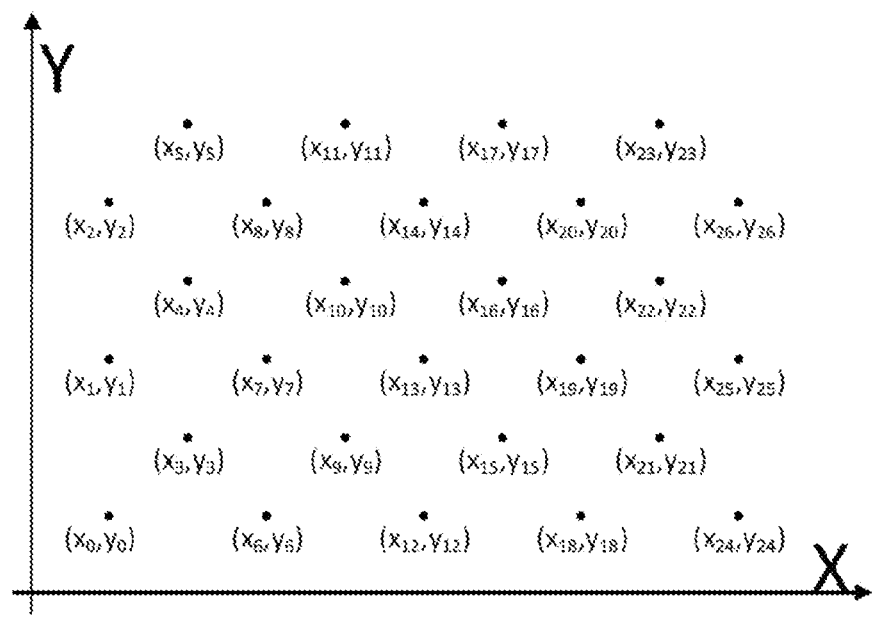
Figure 6:
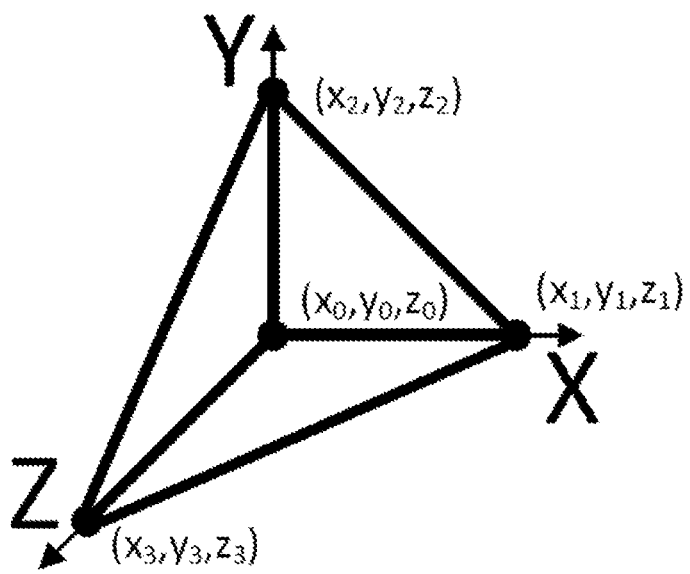
Figure 7:
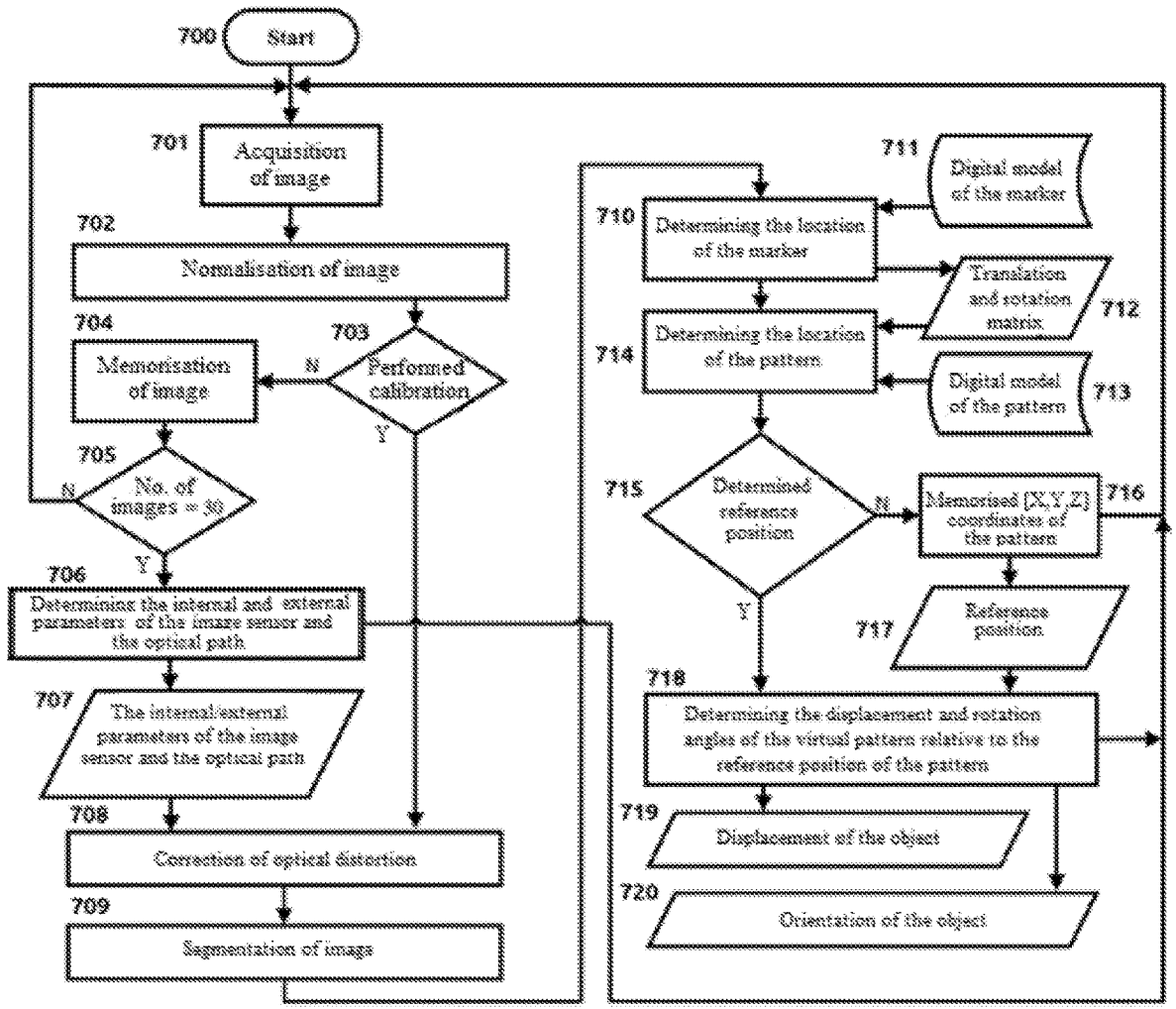

The invention will now be presented in more detail in preferred embodiments, with reference to the attached drawing, in which:

FIG. 1 presents a flowchart of the measuring system for examining deformations, FIG. 2 presents the flowchart of an optical sensor for examining deformations, capable of analysing the recorded data, FIG. 3 presents a preferable example of the orientation of the marker relative to the optical axis of the sensor, FIG. 4 presents an exemplary marker with visible light sources, which can be used as characteristic points, FIG. 5 presents an exemplary marker in the form of the position of light sources, FIG. 6 presents an exemplary virtual marker used for further steps of determining the deformations of the construction element, FIG. 7 presents a flowchart of an embodiment of the method according to the invention.

DETAILED DESCRIPTION

The system for the measurement of deformations has been presented in two primary embodiments. In the first one, presented in FIG. 1, the measuring system has been implemented by means of a measuring system in which each functional element is a separate physical element. In the second embodiment, presented in FIG. 2, the invention has been implemented by means of an optical sensor, in which functional blocks are implemented as part of one device. It should be pointed out that intermediate solutions, which are not described herein, are also possible.

In the first embodiment, presented in FIG. 1, the individual elements of the measuring system are separate physical elements. In this embodiment, the measuring system comprises at least one marker 1, whose position is recorded by at least one sensor 2. It should be pointed out that it is also possible for the position of two and more markers 1 to be recorded by one sensor 2. In a preferable embodiment, one sensor 2 observes one marker 1. The data recorded by the sensors 2 is transmitted in the form of digital data to the processing unit 4, which subsequently converts the data recorded by the sensor 2 into information involving the displacement and rotation of the marker 1. The data from the sensor 2 can be transmitted directly or by means of the receiving unit 3, which in this embodiment is additionally provided with the marker control block 7, which controls the markers 1.

In the above embodiment, the sensor 2, the receiving unit 3, the processing unit 4 are connected to each other by means of a local computer network 6, which simultaneously powers these elements (the PoE technology, Power over Ethernet). Power is provided by the power distribution block 8.

The results of data processing can be transmitted from the processing unit 4 to the end device 5.

In another embodiment, the sensor 2, the receiving unit 3 and the processing unit 4 work in a server-client-server configuration, where the sensor 2 and the processing unit 4 serve the function of the server, while the receiving unit 3 serves the functions of the client. In this arrangement, the sensor 2 and the processing unit 4 await information or commands from the receiving unit 3. The sensor 2 transmits data related to the position of the marker 1 only after receiving a proper commands from the receiving unit 3. Upon collecting data from the sensors 2, the receiving unit 3 transfers the collected data to the processing unit 4. The data from the sensors 2 can be compressed by the receiving unit 3, which allows transmitting a smaller amount of data.

The server-client-server configuration allows the acquisition of data from numerous sensors 2. Furthermore, such a solution provides greater safety of the system—in this configuration, the receiving unit 3 does not receive any instructions, which makes it more difficult to take control over the system remotely.

In another embodiment, the sensor 2 is connected to the receiving unit 3 or the processing unit 4 via a link for the transmission of data.

In yet another embodiment, where the system comprises at least one receiving unit 3 or at least one end device 5, the receiving unit 3 and/or the end device 5 are connected to the processing unit 4 via a link for the transmission of data.

FIG. 2 presents an optical device for measuring the deformations of a structural element via observation of the marker 1 (not shown in FIG. 2). The optical sensor for determining the linear and angular displacements comprises a sensor 2 implemented by the optical path 21, preferably with a constant focal length, as well as a surface image sensor 22 and a processing unit 3, in the form of a miniature digital computer, performing the functions of: a digital signal conversion block 32, a data compression block 33, a data transmission interface 34, a diagnostic block 35, a remote user interface block 31 and a power distribution block 36. The surface image sensor 22 is connected to the processing unit 3, in which the digital signal processing block 32 process the acquired data. The displacement of the object and the Euler angles determined in the digital signal processing block 32 are compressed in the data compressing block 33 and transmitted to the end device 5 (not shown in FIG. 2), in the form of a host computer, by means of the data transmission interface 34.

CCD, CMOS, NMOS (live MOS) matrices are examples of the surface image sensor 22. It is possible to use any other sensor which would allow recording information related to the position of the marker.

It should be pointed out that the optical path 21 can be a pre-set assembly of optical elements, such as lenses, adjusted to a specific measurement site, but also complete object lenses, e.g. for digital cameras, or optical arrangements combined with a surface image sensor 22.

It should be pointed out that an option in which the miniature computer also serves the function of an end device 5 is also possible. In such a case, in the optical device there is additionally an interface enabling the display of the converted data.

In embodiments of the invention, the measurement is performed based on a marker fixedly attached to the examined structural element whose deformation is being measured. FIG. 4 presents an exemplary light-emitting marker. The marker comprises LEDs which are placed in rows. During operation, there is a possibility to turn on the lights only for the duration of the measurement. Such a solution allows saving electrical energy used during the measurements, and enables easy finding of the marker by lighting it up, which is easy to detect by a computer. In a sample marker, it is also possible to light up only certain light sources, which will enable, with the same construction of markers, obtaining unique arrangements, which will enable unambiguous identification of the observed markers. It should be pointed out that the characteristic points of the marker 1 should be easily distinguishable from the entirety of data. This is particularly important when one sensor 2 records data related to the position of two and more markers 1.

In a preferable embodiment, the marker 1 receives commands related to the lighting of characteristic points (turning on and turning off, as well as the specific manner of lighting) from the receiving unit 3 or the processing unit 4. In this configuration, the marker 1 and the receiving unit 3 or the processing unit 4 are communicatively connected to each other, preferably wirelessly.

During later steps of the analysis, the measuring system does not deal with individual light sources, but their certain virtual equivalent. This is why it is preferable for the marker to comprise characteristic points, preferably lit up. This means that from the point of view of image processing, the observed image can be further analysed more easily. Such characteristic points can be individual light sources, the corners of an outline which creates numerous light sources, the edges or corners of lighting areas, etc. In addition, it is preferable for the smallest dimension of the characteristic points to be no smaller than 11 mm. During development of the invention, it was noticed that lighting points with a smaller diameter prevent the performance of the measurement at distances exceeding 50 m. Due to an increase in the size of the lighting points, it is possible to perform the measurement at greater distances, because the points are easily visible for the sensor 2. In addition, during measurements at shorter distances, a larger lighting point facilitates the determination of its position by the larger amount of data related to the position of the point, received by the sensor 2, which increases the precision of determining the position of the characteristic points.

However, it should be pointed out that the size of the characteristic points can be preferably smaller, depending on the distance between the marker 1 and the sensor 2, as well as on the used optical path 22. In some applications, a characteristic point with a dimension of 3 mm was recorded by the sensor 2, and the size of the characteristic points was optimal, especially for small distances between the sensor 2 and the marker 1, where the distance amounts to up to about a dozen metres. For greater distances, up to approx. 50 m, the characteristic points were preferably larger and had a dimension of 5 mm. For distances greater than 50 m, the dimension of characteristic points is preferably larger and amounts to 11 mm. It should be pointed out that the given dimensions are sample dimensions which were used during the development of the invention, and a person skilled in the art will know when to use larger and when to use smaller characteristic points.

In another embodiment, the characteristic points form an asymmetrical shape. Due to this, it is possible to unambiguously determine the position and rotation angles of the marker. Additionally, in the case of using more than one marker 1 in the measuring system, at least two arrangements of characteristic points are preferably used. Even more preferably, each marker has a different arrangement of characteristic points.

In another embodiment, the angle between the optical path 21 of the sensor 2 and a normal to the plane defined by three characteristic points of the marker 1 located the closest to the sensor 2 is higher than 7° and lower than 75°, preferably lower than 40°. Such orientation of the marker 1 relative to the sensor 2 enables reducing the errors of the measuring system. This is associated with avoiding a position of the marker 1 in which the Z axis of the marker 1 is directed perpendicular relative to the plane of the surface sensor image. In each measurement, noise causes a measurement subject to an error of even +/− several degrees, depending on the parameters of the system. When the angle of inclination is small, i.e. approx. 0°, the noise causes the read-out of both negative and positive angles. The noise should equally frequently overestimate as well as underestimate the results; however, with measurements performed at large time intervals, in the order of 30 minutes, it would be difficult to observe the impact of noise on the measurement due to actual deformations of the measured element. In addition, with higher angles of inclination of the marker 1, rotation of the marker 1 is more visible, which is particularly significant when using sensors 2 collecting a smaller amount of data related to the position of the marker 1.

FIG. 3 presents schematically the orientations of the marker 1 relative to the sensor 2. The sensor plane 2 is marked as Q, while the Z axis stands for the axis of the optical path of the sensor 2. Coordinates with a centre in point O are related to the marker 1. In a case where the marker would be positioned perfectly perpendicular to the optical path of the sensor 2, it would be described using the XYZ coordinates shown by a solid line.

It should be pointed out that the invention may also be implemented using markers which do not emit light. In the case of this type of markers, a round-the-clock measurement, with no additional lighting provided, is impossible. In addition, the embodiment presents a solution based on visible light. It should be pointed out that the used light spectrum is arbitrary, provided it is possible to determine the positions of light sources.

FIG. 4 presents an exemplary marker 1 which has twenty-seven point light sources. Each of these points can be turned on or turned off, which allows setting up the desired number of characteristic points and providing points in a proper arrangement. In an embodiment, light sources 1a-c are active, i.e. light-emitting, and they are further recognised as characteristic points. It should be also pointed out that all light sources can light up, or only some of them, selected arbitrarily, which will enable the acquisition of sufficient data for determining the position and rotation of the marker 1. It is necessary for the marker 1 to have at least ten characteristic points, preferably at least fourteen, and even more preferably at least twenty-seven.

Calibration of the optoelectronic sensor (camera), as well as the subsequent search for the values of displacement and orientation of the object, can be performed using a marker in the form of a chessboard or in the form of an asymmetrical grid of circles. The embodiment uses an asymmetrical grid of circles, because its use provides better quality of the produced results and provides higher stability of the produced results during the subsequent calculating function calls. The search for the positions of characteristic points of a planar marker in an imaging arrangement is implemented by solving a Perspective N-Point-type problem, e.g. by using an iterative method based on the Levenberg-Marquardt optimisation and a homographic description. The homography matrix used in this description has a dimension of 3×3, which requires no less than four points to solve it. It should be pointed out that the transmission of a higher number of points favourably affects minimisation of the reprojection error. From the point of view of further data processing, only the position of the centres of circles is important in the converted image. Their number indirectly determines the number of unknowns whose values could be determined. In the embodiment, they are four parameters associated with an internal matrix of the surface image sensor ($f_x$, $f_y$, $c_x$, $c_y$) and five or more parameters related to deformations, including three radial parameters and two tangent parameters (a total of at least nine parameters). On their basis, the actual position of the marker can be determined. Assuming that N stands for the number of characteristic points, and K for the number of images of the marker, it can be noticed that for N=10 and K=1 it is possible to determine 2*10*1=20 limitations. Assuming a limitation that the optical path does not introduce any deformations, four internal parameters and six external parameters are to be determined. This means that in order to find a solution, one must provide such a number of characteristic points which fulfils the inequality $2NK \geq 6K+4$. In a case where K=1, the lowest possible N which creates the possibility of generating a regular and asymmetrical pattern amounts to N=10, which gives $2*10*1 \geq 6*1+4$, and thus 20>10.

FIG. 5 presents reference positions of all characteristic points, which the marker 1 may have. The sensor 2 transmits data related to the position and orientation of the marker 1 to the processing unit 4. Based on the reference positions of characteristic points and information on characteristic points used by the marker 1, the processing unit 4 determines the position of characteristic points in the form of coordinates.

It should be pointed out that the received data related to the position of the marker 1 requires transformations, i.e. determining the rotation and position of the marker 1. It should be pointed out that when having a planar image of the marker and information on the observed element, a person skilled in the art can determine its spatial orientation and position by solving a Perspective N-Point-type problem. This issue will not be discussed in more detail in the application in question.

After extracting from the given characteristic points their centres in the form of coordinates, it is possible to limit the amount of data necessary for further work. Further limitation of the amount of data is associated with transforming the position of characteristic points into a virtual pattern, which is presented in FIG. 6.

The virtual pattern comprises information related to the position and rotation of the marker 1. Information in this form is used during further analysis. By comparing the current virtual pattern to the reference virtual pattern, it is possible to determine the change in the position and orientation of the marker 1, and as a consequence a change in the position and rotation of the examined structural element.

In the case of first activation and configuration of the measuring system, a reference measurement is performed. In such a case, the first recorded data associated with the position of the marker 1 is considered to be reference data, in relation to which displacements and rotations are calculated. In addition, before the first measurement, an analysis of the optical path 21 is performed, and deformations introduced by the optical path 21 are determined. Upon determining the type and intensity of deformations, at least one parameter is determined, which would enable correcting the data received by the sensor 22.

FIG. 7 presents a preferable embodiment of the method according to the invention. Upon activating the system, start 700, step 701 of acquiring the image by the sensor 2 takes place. Subsequently, normalisation of the image is performed in step 702, during which correction of the brightness and colours of the recorded image is performed. Subsequently, in step 703 it is checked whether calibration of the system has been performed. If not, then the image is stored in memory in step 704. Subsequently, it is checked whether a predefined number of images is stored in memory; in the embodiment, step 705 assumes acquiring 30 images. If a lower number of images is stored in the memory, a return to step 701 takes place. In the case of a sufficiently high number of images, in step 706 there is a determination of internal and external sensor parameters 707 related to the sensor 2, and more precisely to the optical path 21 and the surface image sensor 22. Upon determination of the parameters 707, they are stored and used during measurements.

In the case of acquiring subsequent images, step 701, knowing the parameters 707, normalisation is performed, step 702, and upon determining that calibration has been performed, in step 703, correction of the optical distortion is performed, step 708.

The next step is the image segmentation step 709. In this step, elements important from the point of view of further data processing are extracted from the acquired data—markers and characteristic points. Subsequently, the location of the marker is determined in step 710. To this end, data related to the digital model of the marker 711 is collected and a Perspective N-Point problem is solved, which results in adjusting the marker model to the data acquired from the image and determining the translation matrix and the rotation matrix 712.

Subsequently, in step 714, having determined the translation matrix and the rotation matrix 712 and having established the digital pattern model 713, the position and orientation of the virtual pattern are determined on an imaging plane.

In step 715, it is checked whether a reference position has been determined. If not, then step 716 of memorising the coordinates and orientation of the pattern and moving to step 701 of acquiring the image take place. If in step 715 it is determined that the reference position is known, then step 718 of determining for the current position and the current orientation a virtual pattern of the displacement and rotation angles of the virtual pattern relative to the reference position of the pattern takes place. This step is performed after acquiring the previously determined reference position 717. Upon determining the displacement and orientation of the virtual pattern, and therefore the object, a return to step 701 of acquiring the image takes place. In step 718, memorisation of the determined 719 displacement of the object takes place, and in step 720, the determined change in the orientation of the object is saved.

In the embodiment, the step a) of recording and preferably initially processing data related to the position of the marker 1 by the sensor 2 in the form of digital data is performed in step 701, 702, 708 and 709; step b) of transmitting digital data to the processing unit 4, preferably by means of the receiving unit 3, which preferably compresses the received digital data prior to sending it to the processing unit 4, is not shown in FIG. 7 and it can take place after step 718. Steps c), where the rotation and position of the centre of the marker 1 are determined by virtual rotation and adjustment of the reference model of characteristic points of the marker 1 to the digital data and d), where the displacement and rotation of the marker 1 are determined by comparing the rotation and position of the centre of the marker 1, determined in step c), to the reference position of the centre of the marker 1 and the reference rotation of the marker 1, are presented in more detail in steps 710 to 718.

The invention claimed is:

1. A system for measuring the deformations of at least one structural element of a structure, comprising at least one marker (1) fixedly attached to the structural element, at least one sensor (2) configured and programmed to record data related to the position of the marker (1) in the form of digital data, a processing unit (4) configured and programmed to process the data related to the position of the marker (1), connected communicatively to the sensor (2), wherein the marker (1) comprises at least ten light-emitting characteristic points;
wherein the sensor (2) is provided with a surface image sensor (22) and an optical path (21), an angle between the optical axis of the optical path (21) and a normal to the plane defined by three light-emitting characteristic points located the closest to the sensor (2) being greater than 7° and lower than 75°.

2. The system according to claim 1, wherein the light-emitting characteristic points comprise a point light source or a surface light source.

3. The system according to claim 1, wherein the lowest dimension of the light-emitting characteristic points is larger than 3 mm.

4. The system according to claim 1, wherein the marker (1) comprises at least fourteen light-emitting characteristic points.

5. The system according to claim 4, wherein the light-emitting characteristic points form an asymmetrical shape.

6. The system according to claim 1, wherein the system comprises at least two markers (1) having at least two arrangements of light-emitting characteristic points.

7. The system according to claim 1, wherein the light-emitting characteristic points of the marker (1) are adjusted to being controlled by a receiving unit (3) or the processing unit (4), which receiving unit (3) or processing unit (4) is communicatively connected to the marker (1).

8. The system according to claim 1, wherein the sensor (2) is provided with an optical path (21) with a constant focal length.

9. The system according to claim 1, wherein the sensor (2) is connected to a receiving unit (3) or the processing unit (4) via a link for the transmission of data.

10. The system according to claim 1, further comprising at least one receiving unit (3) or at least one end device (5), the at least one receiving unit (3) or the at least one end device (5) being connected to the processing unit (4) via a link for the transmission of data.

11. The system of claim 1, wherein the angle is less than 40 degrees.

12. The system of claim 1, wherein the marker (1) comprises at least twenty-seven light-emitting characteristic points.

13. A method for measuring the deformations of an examined construction implemented in a system comprising at least one marker (1) fixedly attached to an element of the examined construction, at least one sensor (2) configured and programmed to record data related to the position of the marker (1) in the form of digital data, a processing unit (4) configured and programmed to process the data related to the position of the marker (1), connected communicatively to the sensor (2), via a receiving unit (3), which method comprises the steps of:
   a) recording and initially processing the data related to the position of the marker (1) by the sensor (2) in the form of digital data,
   b) transmitting this digital data to the processing unit (4), by means of the receiving unit (3), which compresses the received digital data before transmitting it to the processing unit (4),
characterised in that
a marker (1) comprising at least ten light-emitting characteristic points is used, and by knowing the reference model of the characteristic points of the marker (1) and knowing the reference position of the centre of the marker (1) and the reference rotation of the marker (1),
   c) rotation and position of the centre of the marker (1) are determined by virtual rotation and adjustment of the reference model of characteristic points of the marker (1) to the digital data,
   d) the displacement and rotation of the marker (1) are determined by comparing the rotation and position of the centre of the marker (1), determined in step c), to a reference position of the centre of the marker (1) and a reference rotation of the marker (1);
wherein the sensor 12) is provided with a surface image sensor (22) and an optical path (21), the angle between the optical axis of the optical path (21) and a normal to the plane defined by three light-emitting characteristic points located the closest to the sensor (2) being greater than 7° and lower than 75°.

14. The method according to claim 13, characterised in that calibration is performed before the first measurement, during which, based on the recorded digital data determining the positions and rotation of the marker (1), at least one parameter describing the deformation of the image the by optical path (21) of the sensor (2) is determined, which parameter is used during measurements to correct the recorded digital data.

15. The method according to claim 13, characterised in that the sensor (2), the receiving unit (3) and the processing unit (4) work in a server-client-server architecture, the sensor (2) and the processing unit (4) being the servers, and the receiving unit (3) being the client, where the receiving unit (3), based on preliminarily determined parameters, cyclically sends out commands of transmitting the data from at least one sensor (2), and upon receiving this data transmits it to the processing unit (4).

16. The method according to claim 13, wherein the angle between the optical axis of the optical path (21) and the normal to the plane defined by three characteristic points of the marker (1) located the closest to the sensor (2) is lower than 40°.

* * * * *